United States Patent
Amar et al.

(10) Patent No.: US 12,188,612 B2
(45) Date of Patent: Jan. 7, 2025

(54) INTERCHANGEABLE CONTROL MODULE FOR FIXED AND PORTABLE LUBRICANT DISPENSING DEVICES

(71) Applicants: SKF Canada Limited, Scarborough (CA); Lincoln Industrial Corporation

(72) Inventors: Neila Ben Amar, Calgary (CA); Nathan Donovan, Columbia, IL (US); Shawn Gibson, Calgary (CA); Timothy Andrew Harris, Calgary (CA); Craig McFarland, Calgary (CA); Brian Mitchell, Ballwin, MO (US); Lois Gayle Wride, Calgary (CA); Waheeduz Zaman, Calgary (CA)

(73) Assignees: SKF Canada Limited, Scarborough (CA); Lincoln Industrial Corporation, St. Louis, MO (US)

( * ) Notice: Subject to any disclaimer, the term of this patent is extended or adjusted under 35 U.S.C. 154(b) by 1043 days.

(21) Appl. No.: 16/939,195

(22) Filed: Jul. 27, 2020

(65) Prior Publication Data
US 2020/0355323 A1 Nov. 12, 2020

Related U.S. Application Data

(63) Continuation-in-part of application No. 15/669,570, filed on Aug. 4, 2017, now Pat. No. 11,199,293.

(51) Int. Cl.
F16N 29/02 (2006.01)
B67D 7/08 (2010.01)
(Continued)

(52) U.S. Cl.
CPC .............. F16N 29/02 (2013.01); B67D 7/08 (2013.01); F16N 7/00 (2013.01); F16N 9/00 (2013.01);
(Continued)

(58) Field of Classification Search
CPC ... F16N 29/02; F16N 7/00; F16N 9/00; F16N 2230/02; F16N 2250/00; F16N 2270/20; F16N 2270/70; F16N 11/00; B67D 7/08
See application file for complete search history.

(56) References Cited

U.S. PATENT DOCUMENTS 5,350,040 A    9/1994  Gribble
5,813,496 A *  9/1998  Hyvonen .................. F16N 7/40
                                                184/7.4
(Continued)

FOREIGN PATENT DOCUMENTS

CN    1748189 A      3/2006
CN    101210645 A    7/2008
(Continued)

Primary Examiner — Donnell A Long
(74) Attorney, Agent, or Firm — GARCIA-ZAMOR INTELLECTUAL PROPERTY LAW, LLC; Ruy Garcia-Zamor

(57) ABSTRACT

A system for maintaining the operating condition of a machine is provided. The system includes a dispensing device having: an interchangeable control module, the interchangeable control module including control hardware that provides a central processing unit, a data storage memory, and communication modules. The dispensing device is configured to dispense lubricant in order to maintain the operating condition of the machine. The interchangeable control module is configured to interchangeably control and interchangeably reside in either a fixed or a portable dispensing device. The interchangeable control module communicates to an external or internal intermediary computing device. The interchangeable control module includes interface hardware for facilitating with at least one condition monitoring sensors, and based on measurements received from the at least one condition monitoring sensor, the interchangeable control module determines the amount or type of lubricant required, and creates a maintenance action to be completed.

12 Claims, 5 Drawing Sheets

(51) Int. Cl.
*F16N 7/00* (2006.01)
*F16N 9/00* (2006.01)

(52) U.S. Cl.
CPC ...... *F16N 2230/02* (2013.01); *F16N 2250/00* (2013.01); *F16N 2270/20* (2013.01); *F16N 2270/70* (2013.01)

(56) References Cited

U.S. PATENT DOCUMENTS

| | | | |
|---|---|---|---|
| 6,101,427 A | | 8/2000 | Yang |
| 6,179,597 B1 * | | 1/2001 | Ito .......................... F16N 11/08 |
| | | | 425/157 |
| 6,498,956 B1 * | | 12/2002 | Yang ....................... F16N 29/02 |
| | | | 184/7.4 |
| 6,522,964 B1 | | 2/2003 | Miki et al. |
| 6,997,286 B1 | | 2/2006 | Funck et al. |
| 8,290,630 B2 | | 10/2012 | Lakomiak et al. |
| 8,528,782 B2 | | 9/2013 | Mergener et al. |
| 8,746,068 B2 | | 6/2014 | Goodman et al. |
| 9,352,761 B2 | | 5/2016 | Appleby et al. |
| 9,353,908 B2 | | 5/2016 | Kuvaja et al. |
| 9,500,317 B2 | | 11/2016 | Peters et al. |
| 9,512,962 B2 | | 12/2016 | Alekseyev et al. |
| 2004/0231927 A1 | | 11/2004 | Huang et al. |
| 2004/0250623 A1 | | 12/2004 | Walker et al. |
| 2007/0137942 A1 | | 6/2007 | Weems et al. |
| 2007/0240649 A1 | | 10/2007 | Freeman |
| 2010/0147627 A1 * | | 6/2010 | Lakomiak .............. G01H 1/003 |
| | | | 184/7.4 |
| 2011/0153094 A1 * | | 6/2011 | Botha ..................... F16N 11/00 |
| | | | 700/283 |
| 2011/0253481 A1 | | 10/2011 | Lin |
| 2013/0081903 A1 | | 4/2013 | Alekseyev et al. |
| 2014/0034420 A1 * | | 2/2014 | Frelich .................. E02F 9/2095 |
| | | | 184/6.1 |
| 2014/0142791 A1 | | 5/2014 | Boehni et al. |
| 2016/0169446 A1 | | 6/2016 | Peters et al. |
| 2016/0178122 A1 * | | 6/2016 | Conley ............... F16C 33/6607 |
| | | | 184/26 |
| 2017/0030517 A1 | | 2/2017 | Willems et al. |
| 2017/0089236 A1 | | 3/2017 | Andersen et al. |
| 2018/0017210 A1 | | 1/2018 | Letscher et al. |
| 2018/0063223 A1 | | 3/2018 | Donovan et al. |
| 2019/0040998 A1 | | 2/2019 | Wride et al. |

FOREIGN PATENT DOCUMENTS

| | | | |
|---|---|---|---|
| CN | 105492818 A | 4/2016 | |
| CN | 106441966 A | 2/2017 | |
| EP | 1192387 B1 | 7/2005 | |
| WO | 2013135742 A1 | 9/2013 | |
| WO | WO-2015187682 A1 * | 12/2015 | ........... F16N 19/003 |

* cited by examiner

INTERCHANGEABLE CONTROL MODULE FOR FIXED AND PORTABLE LUBRICANT DISPENSING DEVICES

CROSS-REFERENCE TO RELATED APPLICATIONS

This application is a continuation-in-part of U.S. patent application Ser. No. 15/669,570, which was filed on Aug. 4, 2017, and is incorporated herein by reference in its entirety.

TECHNICAL FIELD OF THE INVENTION

The invention relates to an interchangeable control module for lubricant dispensing devices. More specifically, the invention relates to an interchangeable control module for both fixed and portable lubricant dispensing devices.

BACKGROUND OF THE INVENTION

Systems that incorporate an electronic lubrication dose meter exist. They collect lubrication data (dose, asset/lubrication point and date) during a route. The user must then upload the data via a cable at the completion of the route. There is no automatic interconnectivity.

In terms of technical problems, the interchangeable control module of the present invention will enable the dispensing device to be used with fixed and portable grease meters. This will also allow data related to the use of dispensing devices such as grease guns or grease meters (lubrication date, time, amount, type and location) to be collected automatically. Once available in digital form this data would be useful to plant maintenance managers and can be used by plant management system software.

The invention allows for lubrication data to be provided directly, and automatically, without human intervention if desired. This invention also allows for lubrication routes to be centrally planned and distributed to a network of dispensing devices or fixed and portable grease meters.

SUMMARY OF THE INVENTION

A first aspect of the invention provides a system for maintaining the operating condition of a machine, the system comprising: a dispensing device having: an interchangeable control module, the interchangeable control module including control hardware that provides a central processing unit, a data storage memory, and communication modules, wherein the dispensing device is configured to dispense lubricant in order to maintain the operating condition of the machine, wherein the interchangeable control module is configured to interchangeably control and interchangeably reside in either a fixed or a portable dispensing device, wherein the interchangeable control module communicates to an external or internal intermediary computing device, wherein the interchangeable control module includes interface hardware for facilitating with at least one condition monitoring sensors, and wherein based on measurements received from the at least one condition monitoring sensor, the interchangeable control module determines the amount or type of lubricant required, and creates a maintenance action to be completed.

In a further aspect of the invention, after a maintenance action is completed, a second sensor measurement is used to either confirm the maintenance action was effective or recommend additional maintenance actions.

In a further aspect of the invention, the maintenance action determined skips lubrication of the machine.

In a further aspect of the invention, a system for maintaining the operating condition of a machine comprising: a dispensing device having: an interchangeable control module, the interchangeable control module including control hardware that provides a central processing unit, a data storage memory, and communication modules, wherein the dispensing device is configured to dispense lubricant in order to maintain the operating condition of the machine, wherein the interchangeable control module is configured to interchangeably control and interchangeably reside in either a fixed or a portable dispensing device, wherein the interchangeable control module communicates to an external or internal intermediary computing device, and wherein the interchangeable control module is configured to be connected to an eternal intermediary device and a remote server.

In a further aspect of the invention, wherein the remote server is a multi-tenant cloud server.

In a further aspect of the invention, a system for maintaining the operating condition of a machine, the system comprising: an interchangeable control module, the interchangeable control module including control hardware that provides at least one of a data storage memory, a central processing unit, interface hardware for condition monitoring sensors, an intermediary computing device, a display device, and communication modules, wherein the dispensing device is configured to dispense lubricant in order to maintain the operating condition of the machine, and wherein the interchangeable control module is configured to interchangeably control and interchangeably reside in both a fixed and a portable dispensing device, an inlet for filing a lubricant reservoir with lubricant, an outlet, wherein the dispensing device is configured to eject lubricant into a machine through the outlet; a sensor configured to sense an amount of the lubricant ejected through the outlet; a communication module in communication with the sensor and configured to transmit first data representing the amount of lubricant ejected through the outlet; an intermediary computing device in communication with the communication module, wherein the intermediary computing device is configured to: receive the first data from the communication module; transmit the first data to a remote server; and receive second data representing a maintenance action to take on the dispensing device, the machine, or both from the remote server.

In a further aspect of the invention, the maintenance action comprises at least one selected from the group consisting of: a dosage of lubricant for the machine, a type of lubricant for the machine, a maintenance route to follow using the dispensing device, a corrective action to take on the dispensing device, and a corrective action to take on the machine.

In a further aspect of the invention, a plurality of dispensing devices and a plurality of intermediary computing devices is disclosed. Each of the plurality of dispensing devices including a sensor and a communication module in communication with one of the plurality of intermediary computing devices. The remote server is configured to coordinate a usage of the plurality of dispensing devices based at least in part on an amount of lubricant used in the respective dispensing devices of the plurality of dispensing devices, or a type of lubricant used in the respective dispensing devices, or both.

In a further aspect of the invention, the data received is used to verify lubrication maintenance compliance.

In a further aspect of the invention, the system is used to deliver managed lubrication services or asset lifecycle management services to third parties.

In a further aspect of the invention, the system is used to prescribe remediating actions to a user.

In a final aspect of the invention, the system provides offline route support, and uploads completion data to the remote server.

BRIEF DESCRIPTION OF THE DRAWINGS

The accompanying drawings, which are incorporated in and constitute a part of this specification, illustrate an embodiment of the present teachings and together with the description, serve to explain the principles of the present teachings.

In the figures.

Figure 1:
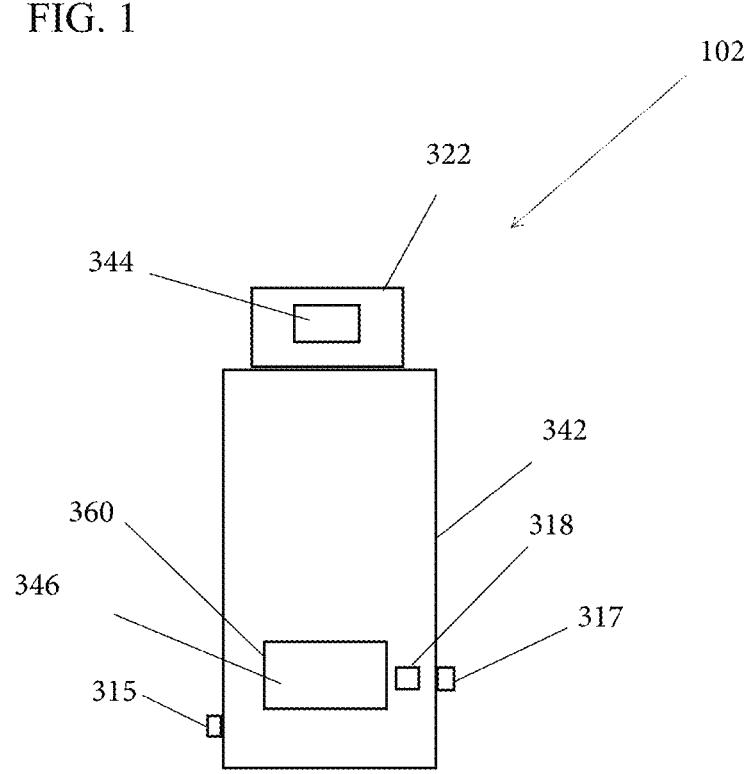
FIG. 1 illustrates a schematic view of a dispensing device having an interchangeable control module according to an embodiment of the present invention.

It should be noted that some details of the figures have been simplified and are drawn to facilitate understanding of the embodiments rather than to maintain strict structural accuracy, detail, and scale.

DETAILED DESCRIPTION OF THE INVENTION

Reference will now be made in detail to embodiments of the present teachings, examples of which are illustrated in the accompanying drawings. In the drawings, like reference numerals have been used throughout to designate identical elements, where convenient. In the following description, reference is made to the accompanying drawings that form a part of the description, and in which is shown by way of illustration one or more specific example embodiments in which the present teachings may be practiced.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such a feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

FIG. 1 illustrates a schematic view of a dispensing device 102, according to an embodiment. The dispensing device 102 is configured to maintain the operating condition of a machine 104. (See also FIG. 3). That is, the dispensing device 102 is configured to dispense lubricant 346 in order to maintain the operating condition of the machine 104 by keeping any rotating components such as bearings and shafts lubricated, etc. With respect to the machine 104, the dispensing device may be provided in the form of a bucket pump, a barrel pump, grease gun, oil pump, or a stand-alone grease meter.

Figure 2:
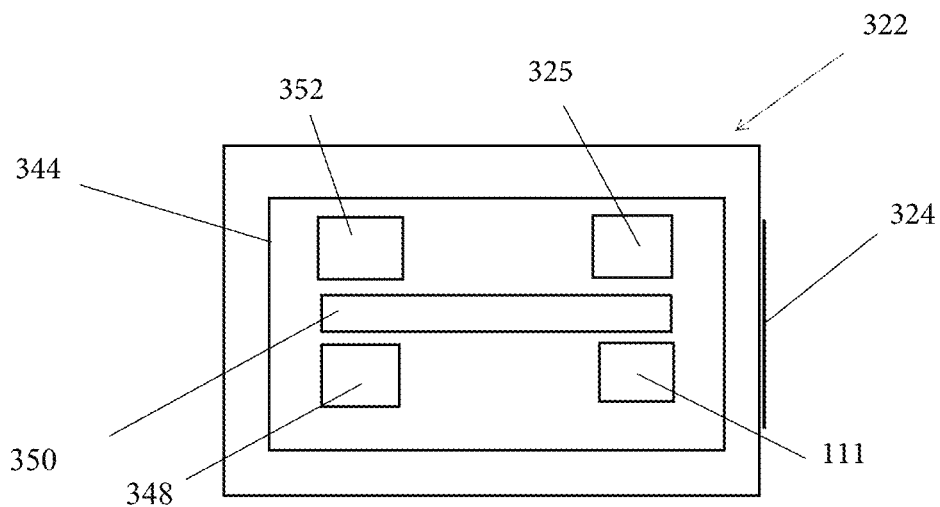
FIG. 2 illustrates an enlarged schematic view of the interchangeable control module according to an embodiment of the present invention.

FIG. 2 illustrates a schematic view of an interchangeable control module 322 that may be provided by the dispensing unit. The interchangeable control module 322 may be interchangeably configured to control both a fixed or a portable lubricant dispensing device. That is, the control module, in the form of the interchangeable control module 322 may be upgraded so that a host of different hardware and functional features are possible.

Accordingly, the interchangeable control module 322 may provide control hardware 344 that includes one or more of a data storage memory 348, a central processing unit 350, interface hardware 352 for condition monitoring sensors 330, an on-board intermediary computing device 111, a display device 324, and communication modules 325. In addition, the interface hardware may also be configured to interface with asset identification sensors. The asset identification sensors may be used to positively confirm that a portable lubrication device is located at a specific machine, or at a specific lubrication point on that machine.

As previously mentioned, the interchangeable control module 322 is configured to interchangeably control and interchangeably reside in both a fixed and a portable dispensing device. Operating condition data collected from the machine 104 such as temperature, vibration, power consumption are stored in the interchangeable control module memory 348.

Figure 5:
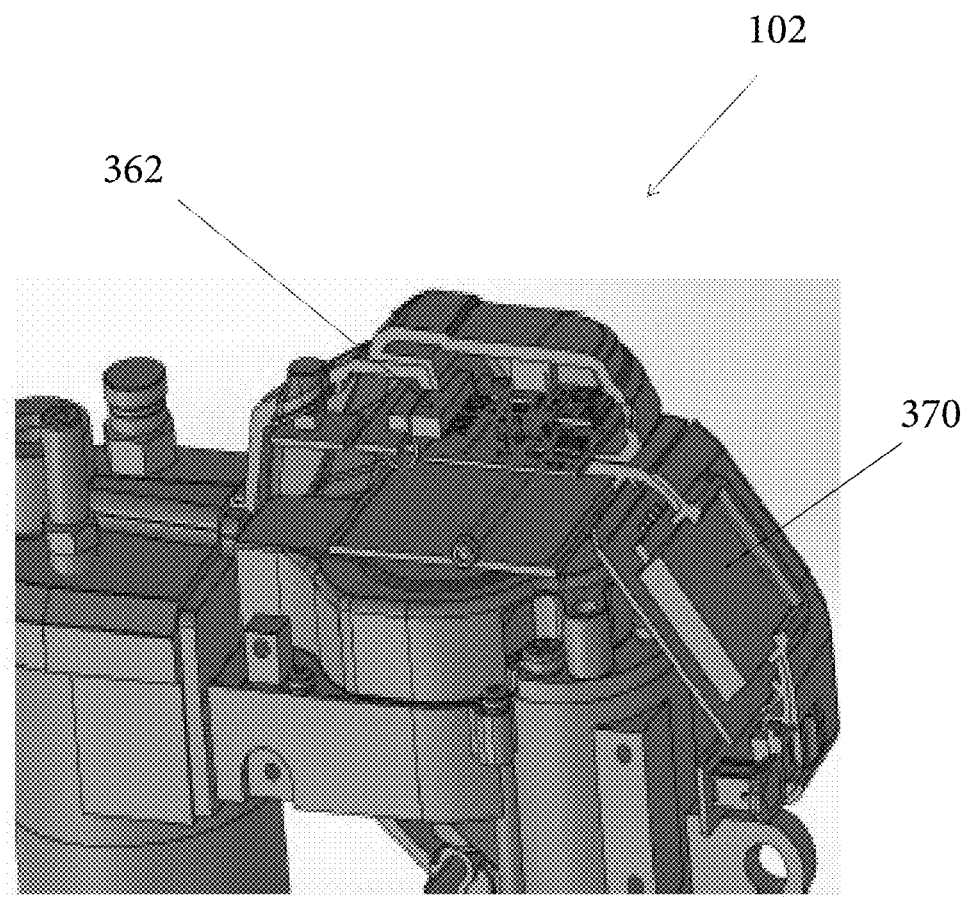
FIG. 5 illustrates a partial section view of a first portion of the interchangeable control module and a second portion of a chassis of the dispensing device according to an embodiment of the present invention.

The dispensing device 102 may further provide a dispensing device chassis 342, where a first portion 370 of the control hardware 344 resides within the dispensing device chassis 342 and a second portion 362 of the control hardware 344 resides within the interchangeable control module 322. Here, the interchangeable control module 322 may be configured to communicate with the display device 324. See FIG. 5.

Figure 6:
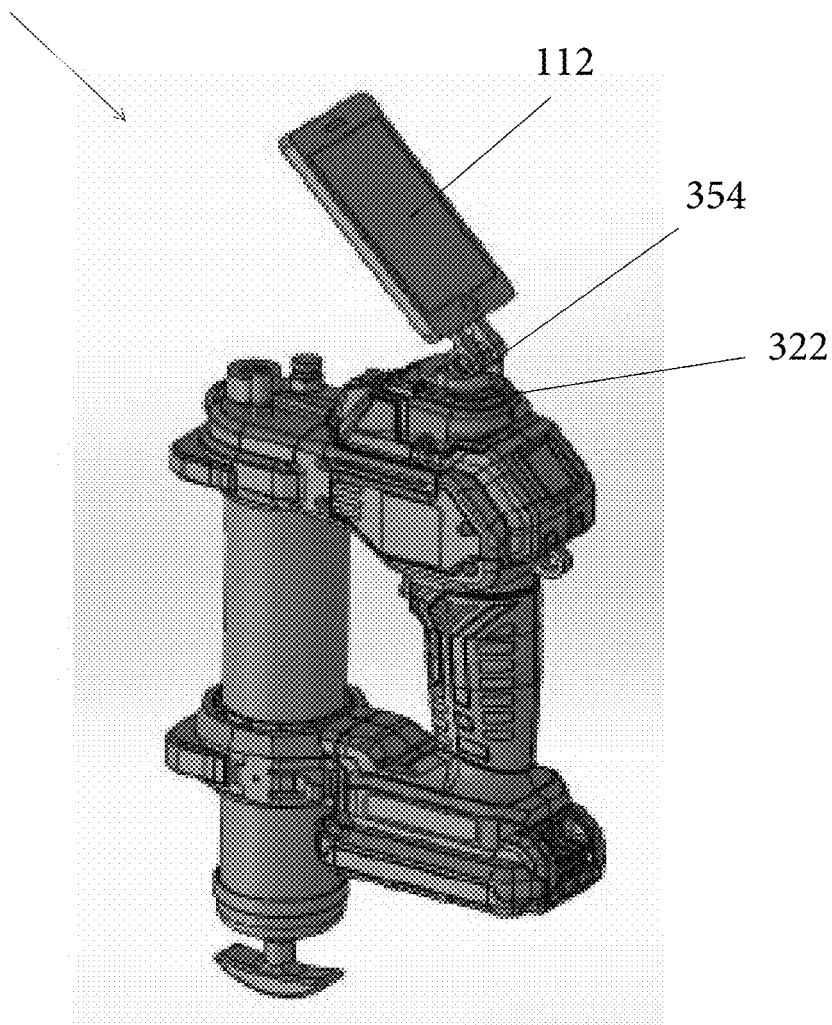
FIG. 6 illustrates an elevated perspective view of a dispensing device having an interchangeable smartphone mount according to an embodiment of the present invention.

In a further embodiment, the interchangeable control module 322 may be integrated into an interchangeable smartphone mount 354. See FIG. 6.

In a further embodiment, all of the control hardware 344 resides in an interchangeable smartphone mount 354. See FIG. 6.

Alternately, the communication module 325 may provide a mobile application software.

The dispensing device 102 senses an amount of lubricant 346 ejected and transmits the dispensing data to the control module 322. Here, the dispensing device 102 senses an amount of lubricant 346 ejected and transmits the data to the control module 322.

Figure 3:
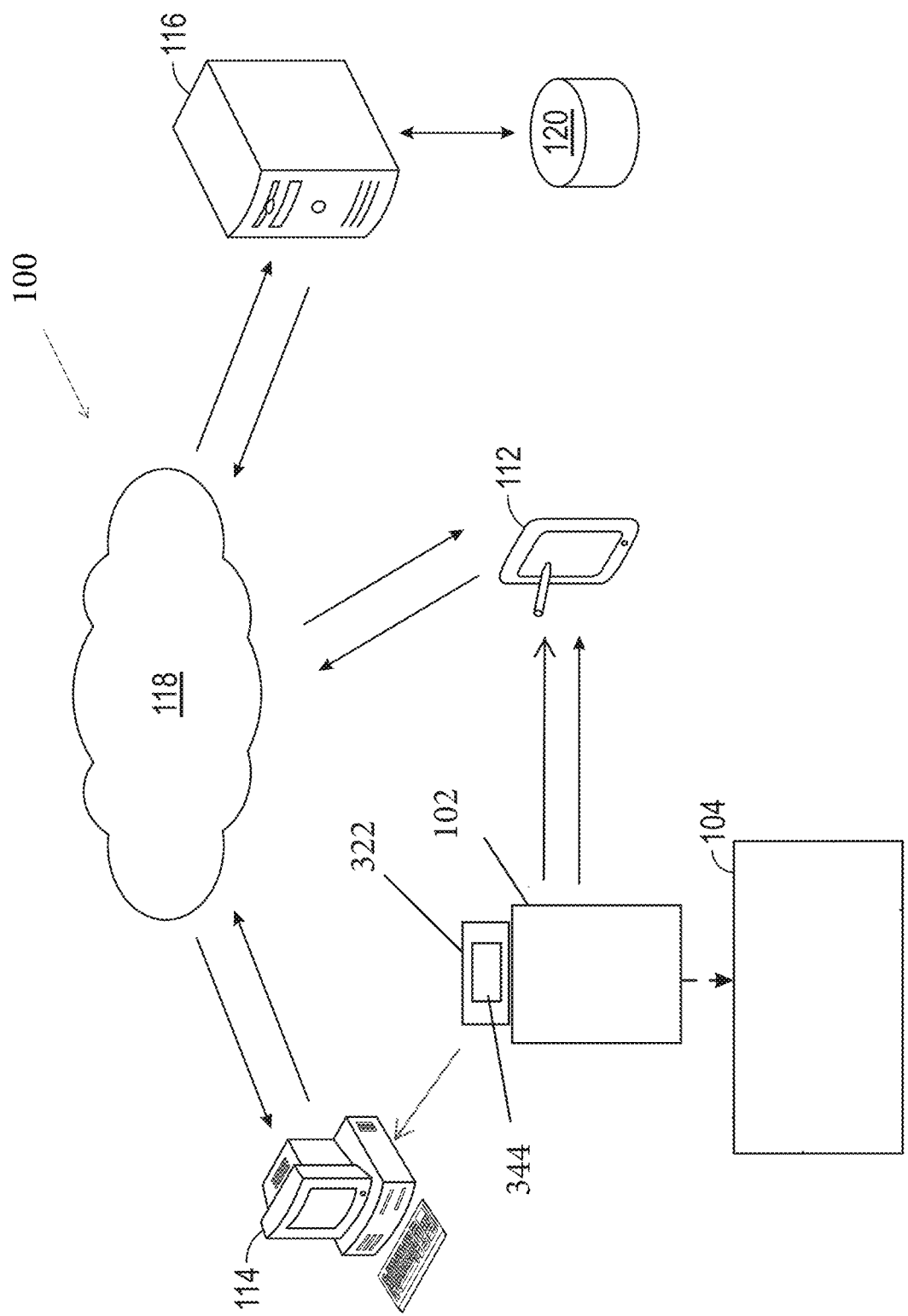
FIG. 3 illustrates a schematic view of a system employing the dispensing device according to an embodiment of the present invention.

FIG. 3 illustrates a system 100 that is, together with the dispensing device 102, configured to maintain the operating condition of a machine 104. Here, the system may provide one or more remote intermediary computing devices 112, 114 and a remote server 116. The interchangeable control module 322 is configured to be connected to the remote intermediary computing device 112,114 and a remote server 116. The one or more remote intermediary computing devices 112,114 may also provide being configured to be in short hop communication with the interchangeable control module 322 and the remote server 116 via the internet 118.

Figure 4:
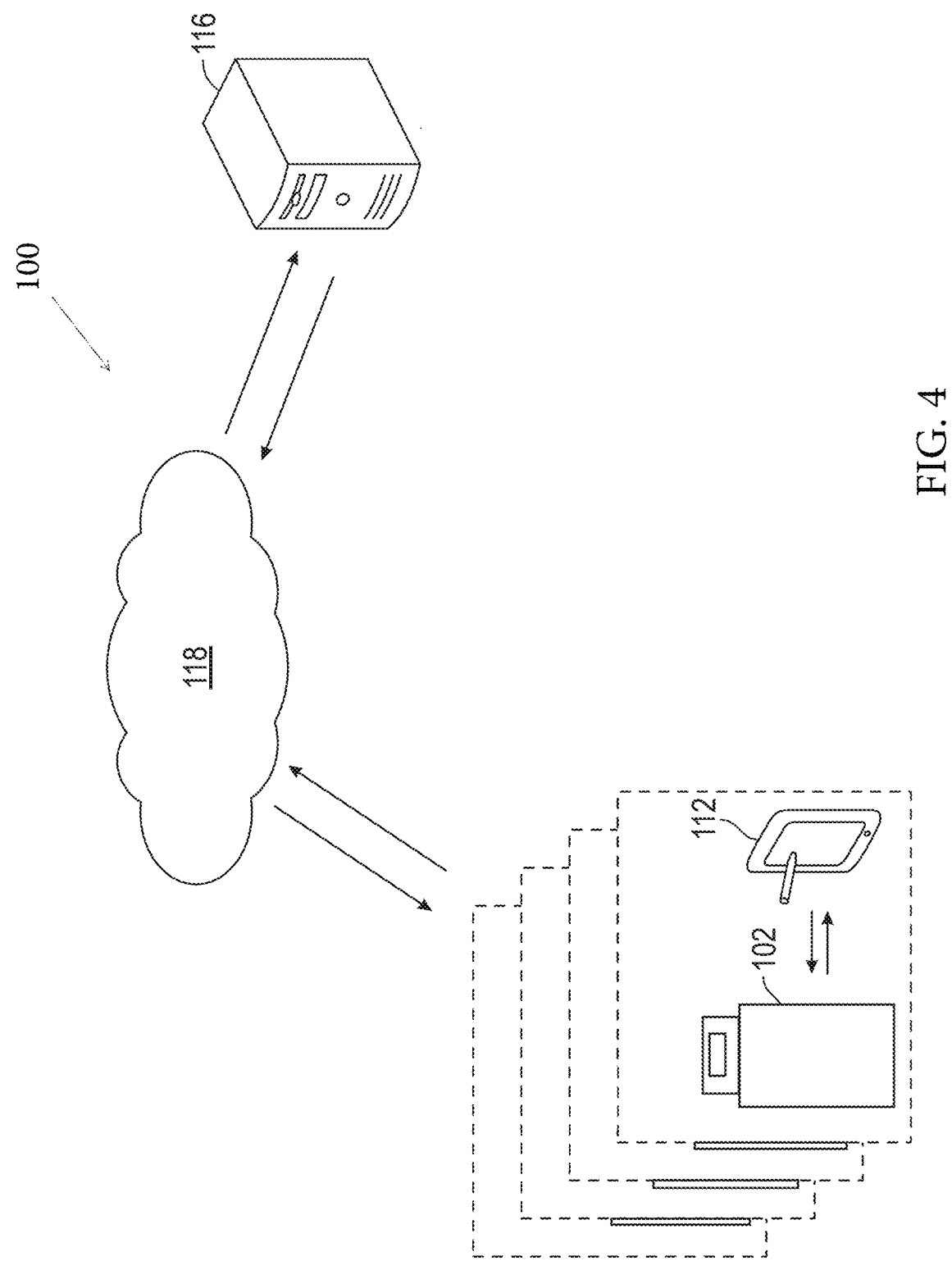
FIG. 4 illustrates a another schematic view of a system showing the potential for a fleet of dispensing devices as part of the system according to an embodiment of the present invention.

FIG. 4 illustrates the system 100 providing a plurality of dispensing devices 102 and a plurality of remote intermediary computing devices 112. Each of the plurality of dispensing devices 102 includes a sensor and a communication module in communication with one of the plurality of intermediary computing devices. Here, the remote server 116 is configured to coordinate a usage of the plurality of dispensing devices 102 based at least in part on an amount of lubricant used in the respective dispensing devices 102, or a type of lubricant used in the respective dispensing devices 102, or both.

The interchangeable control module 322 may provide the capability to transmit machine condition data to a remote intermediary computing device 112, 114. In addition, the interchangeable control module 322 is configured to transmit information received from the remote intermediary computing device 112,114 to the dispensing device display 324. The interchangeable control module 322 is further configured to receive condition monitoring sensor data and dispensing device data at the same time.

The dispensing data is uploaded from the control module device memory 348 to a computer 114 either by hardwire or wirelessly.

In another embodiment, the remote server 116 is a multi-tenant cloud server. Multi-tenant cloud networks provide increased storage and improved access compared to single-tenancy clouds that include limited access and security parameters. Multi-tenancy in cloud computing makes a greater pool of resources available to a larger group of people without sacrificing privacy and security or slowing down applications. The virtualization of storage locations in cloud computing allows for flexibility and ease of access from almost any device or location.

Figure 7:
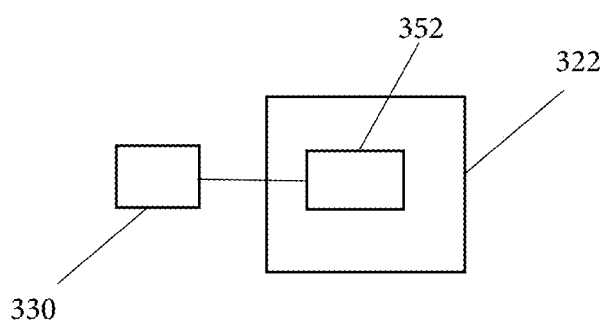
FIG. 7 illustrates a schematic view of the condition monitoring sensors being externally connected with the interface hardware.

So, the system 100 provides an interchangeable control module 322, the interchangeable control module including control hardware 344 that provides at least one of a data storage memory 348, a central processing unit 350, interface hardware 352 for condition monitoring sensors 330 (see FIG. 7), an intermediary computing device 112,114, a display device 324, and communication modules 325. Here, the dispensing device 102 is configured to dispense lubricant 346 in order to maintain the operating condition of the machine 104, the interchangeable control module 322 is configured to interchangeably control and interchangeably reside in both a fixed and a portable dispensing device 102. The dispensing device may provide an inlet 315 for filling a lubricant reservoir 360 with lubricant 346. The dispensing device may also provide an outlet 317. Accordingly, the dispensing device 102 is configured to eject lubricant 346 into a machine 104 through the outlet 317.

A sensor 318 is included that senses an amount of the lubricant 346 ejected through the outlet 317. The communication module 325 is in communication with the sensor 318 and is configured to transmit first data representing the amount of lubricant 346 ejected through the outlet 317. The intermediary computing device 112, 114 is in communication with the communication module 325. The intermediary computing device is configured to receive the first data from the communication module 325. The first data may then be transmitted to the remote server 116. The communication module 325 may also provide being configured to receive second data representing a maintenance action to take on the dispensing device 102, the machine 104, or both from the remote server 116. Please note that there is no order to which the data must be transmitted. That is, first or second are terms used to denote data transmitted in general and not that the data representing the amount of lubrication ejected be transmitted before the data representing a maintenance action to be taken (or vice versa).

The maintenance action may provide at least one selected from the group consisting of: a dosage of lubricant for the machine, a type of lubricant for the machine, a maintenance route to follow using the dispensing device 102, a corrective action to take on the dispensing device 102, and a corrective action to take on the machine.

One purpose for the system is to use the data in order to verify lubrication maintenance compliance. As such, creation of an electronic audit trail where the maintenance actions defined were actually done by the lubrication technician is contemplated in the instant invention. This means that capturing electronic records about specific information like time stamp, user, quantity and type of lubricant, and the lubrication point on the asset so that a maintenance manager can audit the lubrication work and make sure that technicians are lubricating according to the defined procedures is possible.

Another purpose for the system is to deliver managed lubrication services or asset lifecycle management services to third parties. The described system allows one to maintain a customer's assets so that the customer is able to focus on their core competencies. This works together with the compliance element described above to prove to an equipment owner that the lubrication technician performed the maintenance actions as agreed in the contract.

A further purpose for the system contemplates that the data will be used to prescribe remediating actions to the user.

An additional purpose for the system provides Offline route support. Here, it may be necessary for a user to perform a maintenance action (or series of actions, which we typically call a 'route') without being in communication to the remote server. The user downloads the server's route data, performs the maintenance actions, stores the newly generated data in either the control module or remote intermediary until he returns to a location where server communication is possible, and then synchronizes again with the server. Based on this new information, the server may generate new maintenance actions which are in turn downloaded and executed while not in live communication to the server. This cycle of download instructions, execute while off-line, resync repeats perpetually.

The invention claimed is:

1. A system for maintaining the operating condition of a machine, the system comprising: a dispensing device having:
an interchangeable control module, the interchangeable control module including control hardware that provides a central processing unit, a data storage memory, and communication modules, wherein
the data storage memory collects and stores at least one of the group of operating condition data of the machine consisting of: temperature, vibration, and power consumption, wherein
the dispensing device, having a dispensing device chassis where a portion of the control hardware resides, is configured to dispense lubricant in order to maintain the operating condition of the machine, wherein
the interchangeable control module is configured to interchangeably control and interchangeably reside in either a fixed or a portable dispensing device, wherein
the interchangeable control module communicates to an external or internal intermediary computing device, wherein
the interchangeable control module includes interface hardware for facilitating with at least one condition monitoring sensors,
wherein the interchangeable control module is further configured to receive data from the at least one condition monitoring sensor and data from the dispensing device at the same time, and
wherein, based on measurements received from the at least one condition monitoring sensor, the interchangeable control module determines the amount or type of lubricant required, and creates a maintenance action to be completed.

2. The system for maintaining the operating condition of a machine according to claim 1, wherein after a maintenance action is completed, a second sensor measurement is used to either confirm the maintenance action was effective or recommend additional maintenance actions.

3. The system for maintaining the operating condition of a machine according to claim 1, wherein the maintenance action determined skips lubrication of the machine.

4. A system for maintaining the operating condition of a machine comprising: a dispensing device having:
an interchangeable control module, the interchangeable control module including control hardware that provides a central processing unit, a data storage memory, and communication modules, wherein
the data storage memory collects and stores at least one of the group of operating condition data of the machine consisting of: temperature, vibration, and power consumption, wherein
the dispensing device, having a dispensing device chassis where a portion of the control hardware resides, is configured to dispense lubricant in order to maintain the operating condition of the machine, wherein
the interchangeable control module is configured to interchangeably control and interchangeably reside in either a fixed or a portable dispensing device, wherein
the interchangeable control module communicates to an external or internal intermediary computing device, and wherein
the interchangeable control module is configured to be connected to an eternal intermediary device and a remote server
and further comprising an asset identification sensor that confirms that a portable lubrication device is located at a specific machine or at a specific lubrication point on the machine.

5. The system for maintaining the operating condition of a machine according to claim 4, wherein the remote server is a multi-tenant cloud server.

6. A system for maintaining the operating condition of a machine, the system comprising:
an interchangeable control module, the interchangeable control module including control hardware that provides at least one of a data storage memory, a central processing unit, interface hardware for condition monitoring sensors, an intermediary computing device, a display device, and communication modules,
wherein the interchangeable control module is further configured to receive data from the at least one condition monitoring sensor and data from the dispensing device at the same time, wherein
the data storage memory collects and stores at least one of the group of operating condition data of the machine consisting of: temperature, vibration, and power consumption, wherein
the dispensing device, having a dispensing device chassis where a portion of the control hardware resides, is configured to dispense lubricant in order to maintain the operating condition of the machine, and wherein
the interchangeable control module is configured to interchangeably control and interchangeably reside in both a fixed and a portable dispensing device,
an inlet for filing a lubricant reservoir with lubricant,
an outlet, wherein
the dispensing device is configured to eject lubricant into a machine through the outlet;
a sensor configured to sense an amount of the lubricant ejected through the outlet;
a communication module in communication with the sensor and configured to transmit first data representing the amount of lubricant ejected through the outlet;
an intermediary computing device in communication with the communication module, wherein the intermediary computing device is configured to:
receive the first data from the communication module;
transmit the first data to a remote server; and
receive second data representing a maintenance action to take on the dispensing device, the machine, or both from the remote server,
wherein the system further comprising an asset identification sensor that confirms that a portable lubrication device is located at a specific machine or at a specific lubrication point on the machine.

7. The system for maintaining the operating condition of a machine according to claim 6, wherein the maintenance action comprises at least one selected from the group consisting of: a dosage of lubricant for the machine, a type of lubricant for the machine, a maintenance route to follow using the dispensing device, a corrective action to take on the dispensing device, and a corrective action to take on the machine.

8. The system for maintaining the operating condition of a machine according to claim 6, further comprising a plurality of dispensing devices and a plurality of intermediary computing devices, each of the plurality of dispensing devices including a sensor and a communication module in communication with one of the plurality of intermediary computing devices, wherein the remote server is configured to coordinate a usage of the plurality of dispensing devices based at least in part on an amount of lubricant used in the respective dispensing devices of the plurality of dispensing devices, or a type of lubricant used in the respective dispensing devices, or both.

9. The system for maintaining the operating condition of a machine according to claim 6, wherein the data received is used to verify lubrication maintenance compliance.

10. The system for maintaining the operating condition of a machine according to claim 6, wherein the system is used to deliver managed lubrication services or asset lifecycle management services to third parties.

11. The system for maintaining the operating condition of a machine according to claim 6, wherein the system is used to prescribe remediating actions to a user.

12. The system for maintaining the operating condition of a machine according to claim 6, wherein the system provides offline route support, and uploads completion data to the remote server.

* * * * *